United States Patent [19]

Negi et al.

[11] Patent Number: 4,897,831
[45] Date of Patent: Jan. 30, 1990

[54] DATA TRANSMISSION/RECEPTION APPARATUS

[75] Inventors: Tsuneo Negi, Yokohama; Sadasuke Kurahayashi, Niiza; Teruyuki Nishii, Yokohama; Yasuhide Ueno, Fuchu; Masahiro Sakamoto, Tokyo; Takeshi Ono, Yokohama, all of Japan

[73] Assignee: Canon Kabushiki Kaisha, Tokyo, Japan

[21] Appl. No.: 162,266

[22] Filed: Feb. 29, 1988

[30] Foreign Application Priority Data

Mar. 2, 1987 [JP] Japan .............................. 62-045340
Mar. 2, 1987 [JP] Japan .............................. 62-045341
Mar. 2, 1987 [JP] Japan .............................. 62-045342

[51] Int. Cl.$^4$ .............................................. H04L 5/16
[52] U.S. Cl. ........................................ 370/29; 370/31
[58] Field of Search ...................... 370/31, 24, 29, 30, 370/13, 17; 371/22

[56] References Cited

U.S. PATENT DOCUMENTS 3,956,589  5/1976  Weathers et al. ..................... 370/31
4,351,059  9/1982  Gregoire et al. ...................... 371/22
4,653,044  3/1987  Kudo .................................... 370/31

FOREIGN PATENT DOCUMENTS 3515836  11/1985  Fed. Rep. of Germany ........ 370/31
0214035   9/1988  Japan .................................... 370/31
0214036   9/1988  Japan .................................... 370/31

Primary Examiner—Douglas W. Olms
Assistant Examiner—Melvin Marcelo
Attorney, Agent, or Firm—Fitzpatrick, Cella, Harper & Scinto

[57] ABSTRACT

A data communication apparatus includes a data communication section for preforming data communication according to full duplex communication, a testing section for performing a communication test prior to the data communication, and a transmission controller for determining whether full duplex communication can be performed during a period of the communication test performed by the testing section. The testing section includes a backward signal generator, a backward signal detector, and a control signal analyzer. The backward signal generator and the backward signal detector may be replaced with an echo canceller.

13 Claims, 10 Drawing Sheets

DATA TRANSMISSION/RECEPTION APPARATUS

BACKGROUND OF THE INVENTION

1. Field of the Invention

The present invention relates to a data communication apparatus having a full duplex communication function.

2. Related Background Art

An image communication apparatus having an image transmission function according to error control protocols is known as a conventional data communication apparatus of this type. An apparatus for performing half duplex communication in pre- and post-message procedures and full duplex communication in only image transmission is known as described in "Shisetsu" (Vol. 38, No. 5, 1986, P. 59) published by NTT.

A receiver for such a communication apparatus acknowledges to a sender that the receiver has an error control function by using initial identification signals NSF (nonstandard apparatus) and DIS (digital identification signal). In response to these signals, the sender sends back receive command signals NSS (nonstandard apparatus setting) and DCS (digital command signal). This communications allows the sender to acknowledge that the error control protocols are effected. The sender then sends out a training check signal TCF to the receiver. The training check signal is a signal of all "0"s and is transmitted for 1.5 seconds at an image signal bit rate of 9,600 bps, 7,200 bps, 4,800 bps, or 2,400 bps.

The receiver detects a receive-ready signal CFR sent from the receiver in response to the training check signal TCF. The sender starts transmitting the image signal.

When a receive ready acknowledge signal CFR is received from the receiver in response to the training check signal TCF, the sender starts transmission of the image signal.

The receiver demodulates the received image signal and performs error monitoring. When an error is detected, the receiver transmits an error acknowledgment signal NACK.

The sender monitors reception of the error acknowledgment signal NACK during transmission of the image signal. When the sender detects the error acknowledgment signal, the sender stops transmitting the image signal. The sender receives a control signal from the receiver after the sender has received the error acknowledgment signal NACK. In response to this control signal, the sender starts retransmitting the image signal from a designated portion.

In this manner, high-quality facsimile transmission free from errors can be performed.

However, the conventional visual communication system described above has the following disadvantages:

(1) A communication circuit state in a direction from the sender to the receiver may be different to that in a direction from the receiver to the sender. For this reason, even if the image signal is normally transmitted from the sender to the receiver, the error acknowledgment signal may not be accurately detected by the sender upon detection of a reception error. A normal error control protocol cannot then be effected between the sender and the receiver. As a result, a communication disable state is caused to result in a disadvantage (the first disadvantage).

(2) A communication defect may occur due to transmission delay of the transmission line. More specifically, even if the receiver detects an error of the image signal and sends out the error acknowledgment signal NACK, it takes at least a delay time of, e.g., about one second, to send the error acknowledgment signal NACK to the sender. In this case, in order to retransmit data, the sender must store data, the volume of which corresponds to 2 seconds. For example, if a transmission speed of the image data is 9,600 bps, a memory capacity of 2.4 kbytes (=(9,600×2)/8) is required. In addition, when detection time of the error acknowledgment signal NACK and an influence of an echo suppressor in international communications are taken into consideration, a larger memory capacity is required.

When a facsimile system having a small memory capacity is used to perform communication through a transmission line having a large transmission delay, an image cannot be transmitted again, and communication cannot be established, thus causing a disadvantage (the second disadvantage).

(3) In order to prevent the first and second disadvantages, a communication apparatus may have a memory having a large capacity. However, this results in a bulky apparatus at high cost, thus causing a disadvantage (the third disadvantage).

Other data communication apparatuses are described in U.S. Ser. No. 679,558 (Dec. 7, 1984), U.S. Ser. No. 834,779 (Feb. 28, 1986), and U.S. Ser. No. 847,684 (Apr. 3, 1986) filed by the present applicant. The apparatus described in U.S. Ser. No. 679,558 aims at performing error rate check more strictly as time passes. The apparatus described in U.S. Ser. No. 834,779 aims at retransmitting data when the predetermined number of successive errors is detected. The apparatus described in U.S. Ser. No. 847,684 aims at retransmitting data by causing a sender and a receiver to control a function of an echo suppressor.

SUMMARY OF THE INVENTION

It is an object of the present invention to eliminate the conventional disadvantages described above.

It is another object of the present invention to improve a data communication apparatus.

It is still another object of the present invention to provide a data communication apparatus capable of performing optimal data communication regardless of communication circuit states.

It is still another object of the present invention to test full duplex communication during training prior to data communication.

It is still another object of the present invention to determine whether full duplex communication can be performed in accordance with the presence/absence of a response signal from a receiver during transmission of the training signal.

It is still another object of the present invention to perform full duplex communication in accordance with whether data is received within a predetermined period of time after a signal is sent out to the sender in response to the training signal from the sender.

It is still another object of the present invention to test full duplex communication during training in accordance with a capacity of a memory for storing data.

It is still another object of the present invention to set a training period in accordance with a capacity of a memory for storing data and test full duplex communication during the training period.

It is still another object of the present invention to perform half duplex communication in accordance with a communication circuit state.

The above and other objects, features, and advantages of the present invention will be apparent from the detailed description of the preferred embodiments.

DETAILED DESCRIPTION OF THE PREFERRED EMBODIMENTS

Preferred embodiments of the present invention will be described with reference to the accompanying drawings.

Figure 1:
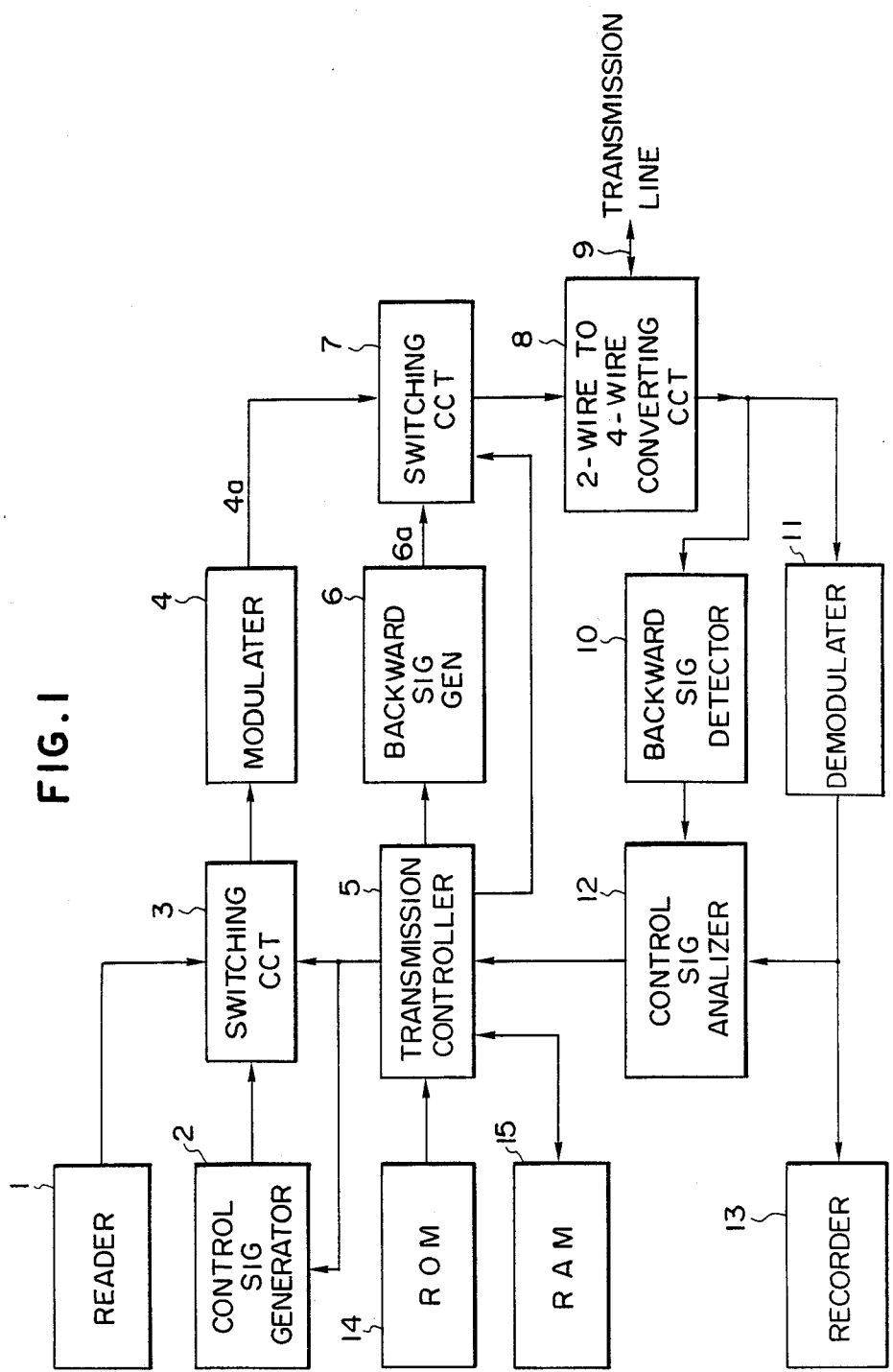
FIG. 1 is a block diagram of a facsimile apparatus according to an embodiment of the present invention.

FIG. 1 is a block diagram of a GIII facsimile apparatus according to an embodiment of the present invention.

Referring to FIG. 1, the facsimile apparatus includes an image reader 1 for reading image data and converting it into an electrical signal, a control signal generator 2 for controlling communication, a switching circuit 3 for selecting the image signal from the reader 1 or a control signal generated by the control signal generator 2, a modulator 4 for modulating an output signal from the switching circuit 3 (a modulator complying with CCITT recommendation V21 for the control signal; and a modulator complying with the CCITT recommendation V27ter or V29 for the image signal), and a transmission controller 5 for controlling transmission protocols. The facsimile apparatus also includes a backward signal generator 6 (the backward signal from the V27ter- or V29-modulator is a single tone (a band of 2,900 Hz or more and 400 Hz or less) having a band excluding the required modulation band or is generated by using a low-speed modulator having a baud rate of 75 bps), a switching circuit 7 for switching a modulated signal 4a and a backward signal 6a, a 2-wire to 4-wire converting circuit 8, a 2-wire transmission line 9, a backward signal detector 10 for detecting a backward signal sent from the receiver through the transmission line 9, a demodulator 11 for demodulating the modulated signal sent through the transmission line 9, a control signal analyzer 12 for analyzing a communication control signal on the basis of output signals from the backward signal detector 10 and the demodulator 11, a received image recorder 13, a ROM 14 for storing control protocols (to be described later) shown in FIGS. 5 and 6, and a RAM 15 for storing various types of data.

An operation for transmitting image data will be described with reference to the block diagram of FIG. 1.

A 300-bps control signal sent from the receiver through the transmission line 9 is branched by the 2-wire to 4-wire converting circuit 8. The branched signals are respectively input to the backward signal detector 10 and the demodulator 11. In this case, since the input signals are 300-bps control signals, an output from the backward signal detector 10 is not a significant signal. In this case, only an output from the demodulator 11 is valid. The output signal from the demodulator 11 is analyzed by the control signal analyzer 12. The transmission controller 5 causes the control signal generator 2 to generate a control signal corresponding to the analyzed control signal. The control signal from the control signal generator 2 is input to the modulator 4 through the switching circuit 3. The modulated output 4a from the modulator 4 is sent out to the 2-wire to 4-wire converting circuit 8 through the switching circuit 7 and onto the transmission line 9.

Figure 2:
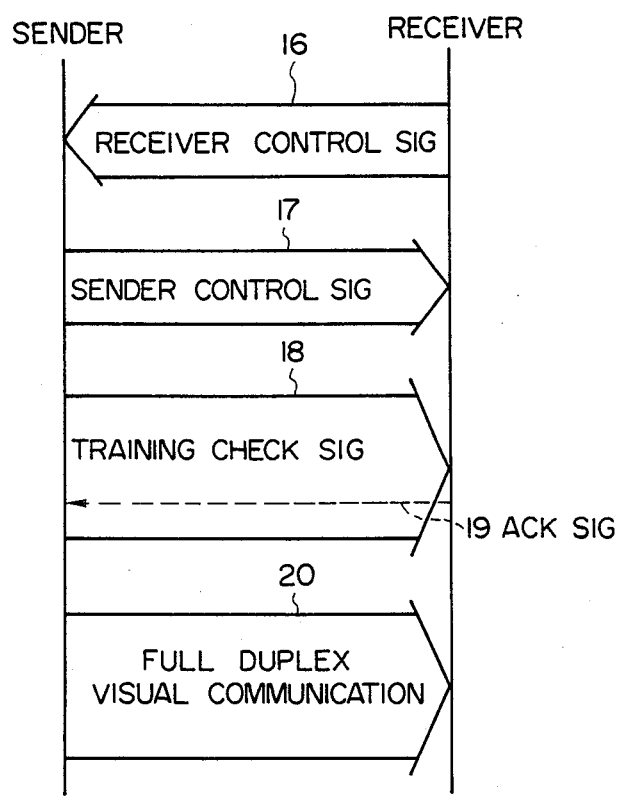
FIG. 2 is a view for explaining full duplex communication.
Figure 3:
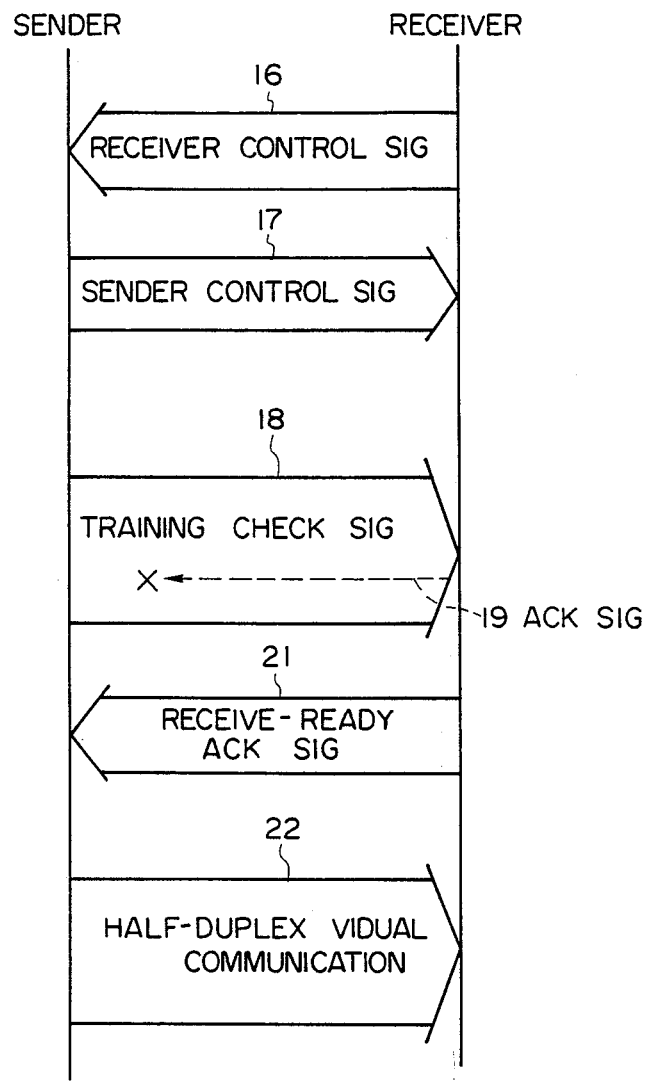
FIG. 3 is a view for explaining half duplex communication.

FIG. 2 is a view showing a sequence when the facsimile apparatus shown in FIG. 1 performs full duplex communication. FIG. 3 is a view showing a sequence when the facsimile apparatus performs half duplex communication.

Figure 4:
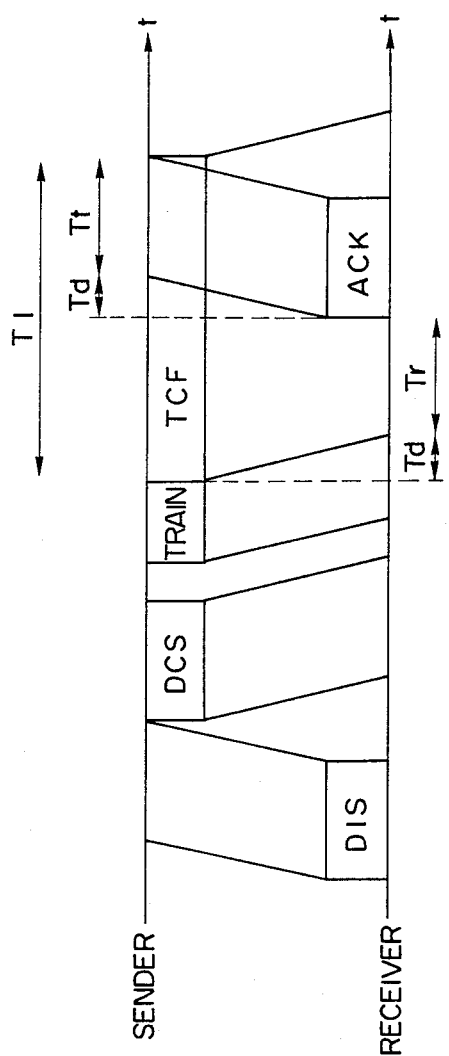
FIG. 4 is a view showing a transmission delay state of a control signal.

FIG. 4 is a timing chart of control signals sent out from the sender and the receiver, including transmission delay times.

Figure 5:
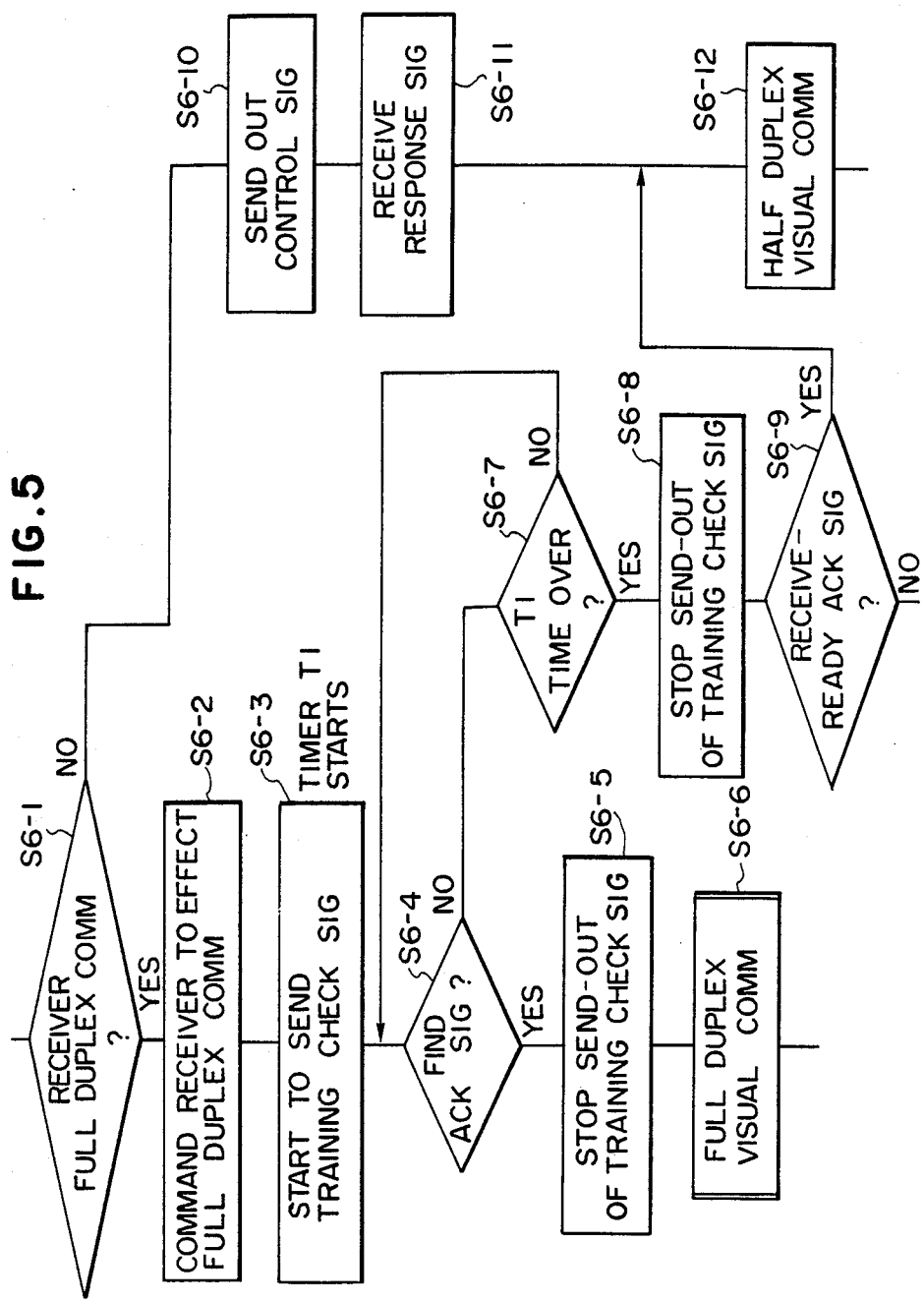
FIG. 5 is a flow chart showing control protocols of a sender.
Figure 6:
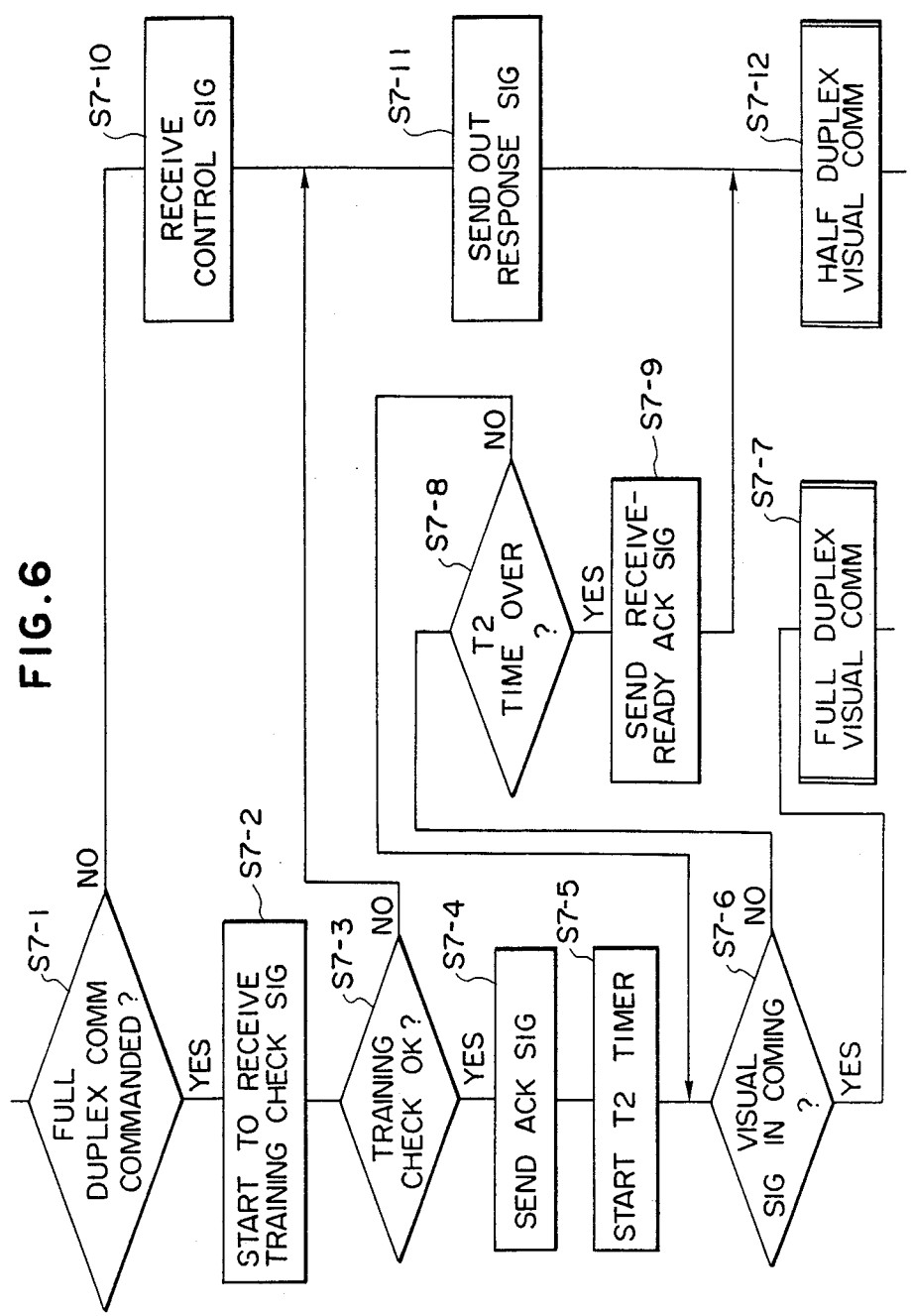
FIG. 6 is a flow chart showing control protocols of a receiver.

FIG. 5 is a flow chart showing the control protocol to be effected by the sender facsimile apparatus, and FIG. 6 is a flow chart showing the control protocol to be effected by the receiver facsimile apparatus.

The operation for transmitting an image according to full duplex communication will be described with reference to FIGS. 2, 5, and 6.

As shown in FIG. 2, the sender receives a receiver control signal 16 sent from the receiver to determine whether the receiver has a full duplex communication function (step S6-1). If YES in step S6-1, the sender commands to cause the receiver to effect full duplex communication in accordance with a sender control signal 17 (steps S6-2 and S7-1). The sender causes a high-speed modem to send out a training check signal 18 (TCF) to check a state of the communication circuit (i.e., the transmission line) (step S6-3).

The receiver monitors a reception state (step S7-3) while receiving the training check signal 18 (step S7-2). Normally, since the training check signal 18 is a signal of all "0"s, the receiver detects a predetermined number of "0"s (while the training check signal 18 is still present on the transmission line) and sends back an ACK signal 19 as a signal representing that full duplex communication is possible to the sender (step S7-4). The ACK signal has the same format as that of the error acknowledgment signal NACK in this embodiment.

When the backward signal detector 10 of the sender detects the ACK signal 19 during sending of the training check signal 18 (step S6-4), the sender determines that full duplex communication is possible. The sender stops transmitting the training check signal 18 (step S6-5) and starts full duplex visual communication 20 (step S6-6).

An operation for transmitting an image according to half duplex communication will be described with reference to FIGS. 3, 5, and 6.

As shown in FIG. 3, when the ACK signal 19 from the receiver is not detected by the receiver due to some reason (step S6-4), the sender waits for a predetermined period of time (steps S6-3, S6-4, and S6-7) and stops sending the training check signal 18 (step S6-8).

The receiver awaits the full duplex visual communication signal 20 (FIG. 3) (steps S7-4, S7-5, and S7-6). However, since the signal 20 does not reach the receiver, the "time over" occurs (step S7-8). The receiver sends back a receive-ready signal 21 to the sender through a 300-bps modem (step S7-9). Therefore, the sender prepares for half duplex visual communication (step S7-12).

When a 300-bps modem of the sender detects the receive-ready signal 21 (step S6-9), the sender determines that full duplex communication is impossible and starts half duplex visual communication 22 (step S6-12).

The "T1 time over" in step S6-7 in FIG. 5 will be described in more detail.

"T1" is a time set in a timer arranged in the sender, and an actual length of time T1 is shown in FIG. 4. FIG. 4 shows a timing of pre-message protocol including the propagation delay time caused by the communication circuit. Td in FIG. 4 represents a predetermined propagation time between the start of signal transmission and arrival of the signal to the destination. In this embodiment, the time period of duration of the training check signal (TCF) is controlled to coincide with the time set in the T1 timer.

As is apparent from FIG. 4, time T1 is determined as follows:

$$T1 = Td \times 2 + Tr + Tt$$

where Tr is the time required for detecting the TCF signal in the receiver, and Tt is the time required for detecting the ACK signal in the sender.

T1 is also determined in association with the capacity of the memory arranged in the sender. For example, if Td=1 second and Tr=Tt=0, then T1=2 seconds. Therefore, the volume of data sent within 2 seconds is given as follows if the transmission speed is 9,600 bps:

$$9,600 \times 2 \times \frac{1}{8} = 2400 \text{ bytes}$$

If a memory capacity of the sender is small, the time T1 of the timer must be set to be short. As a result, if the propagation time of the ACK signal from the receiver during the training check sequence exceeds the preset time T1, the propagation delay time of the circuit is determined to be long (i.e., even if the error acknowledgment signal NACK is detected, normal retransmission cannot be performed, and the image signal is transmitted without the error control protocols (image transmission by half duplex communication).

In this case, since error control is not performed, the quality of the received image signal is degraded. However, if the state of the communication circuit from the sender to the receiver is good at the time of training check, a probability for generating an error is extremely low, and no practical problems are posed.

Figure 7:
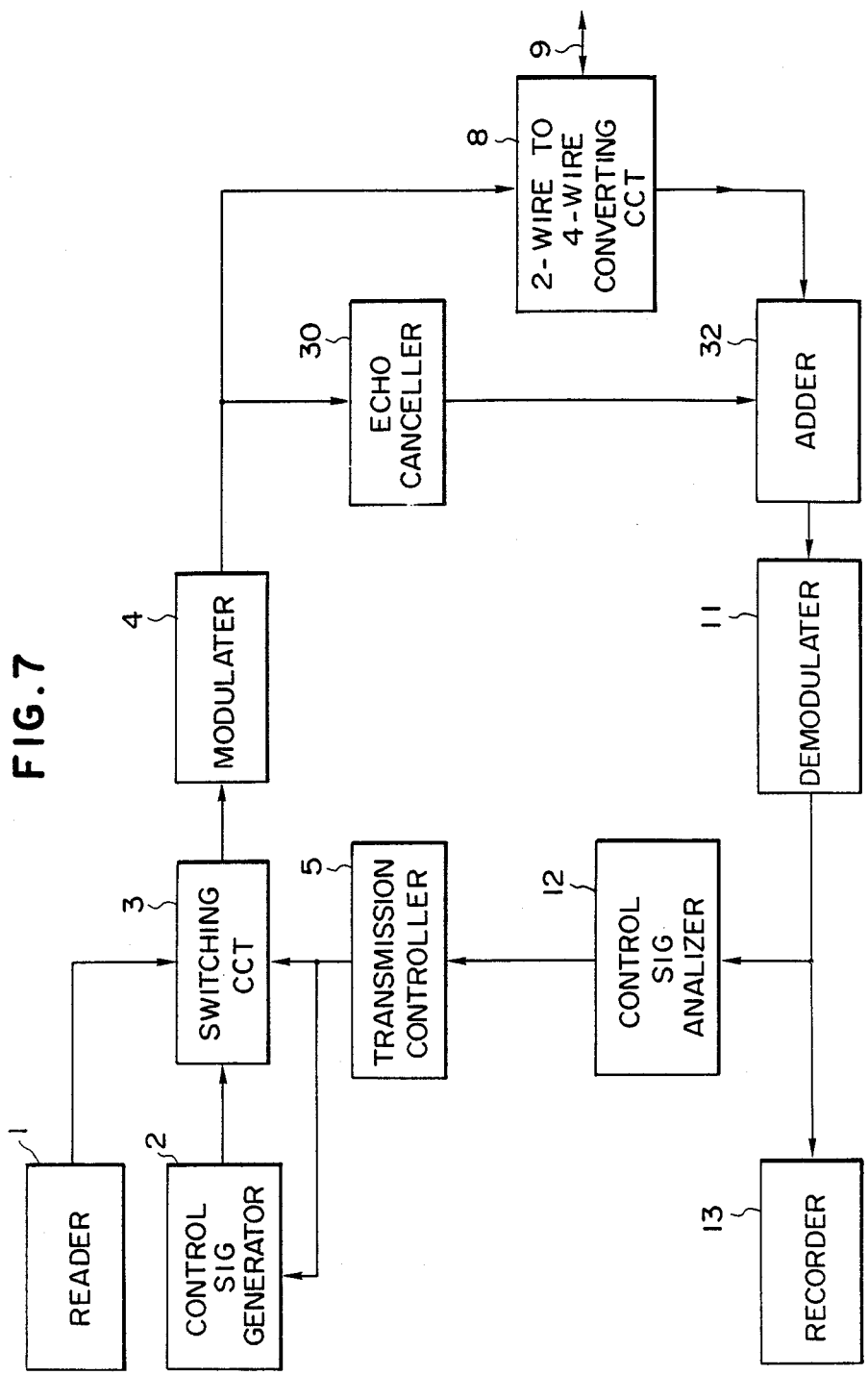
FIG. 7 is a block diagram showing another embodiment of the present invention.

FIG. 7 is a block diagram showing another embodiment of the present invention. The same reference numerals as in FIG. 1 denote the same parts in FIG. 7. The backward signal generator 6 and the backward signal detector 10 are used to perform full duplex communication in the embodiment of FIG. 1. However, in the embodiment of FIG. 7, the backward signal generator 6 and the backward signal detector 10 are replaced with an echo canceller 30. In this case, a demodulator 11 in the sender modem serves as a backward signal detector, and a modulator 4 in the receiver modem serves as a backward signal generator.

In the embodiment of FIG. 7, all tests of full duplex communication are performed during the training period prior to image data communication. Whether full duplex communication is possible can be determined prior to actual image data communication. Therefore, communication can be efficiently performed.

Figure 8:
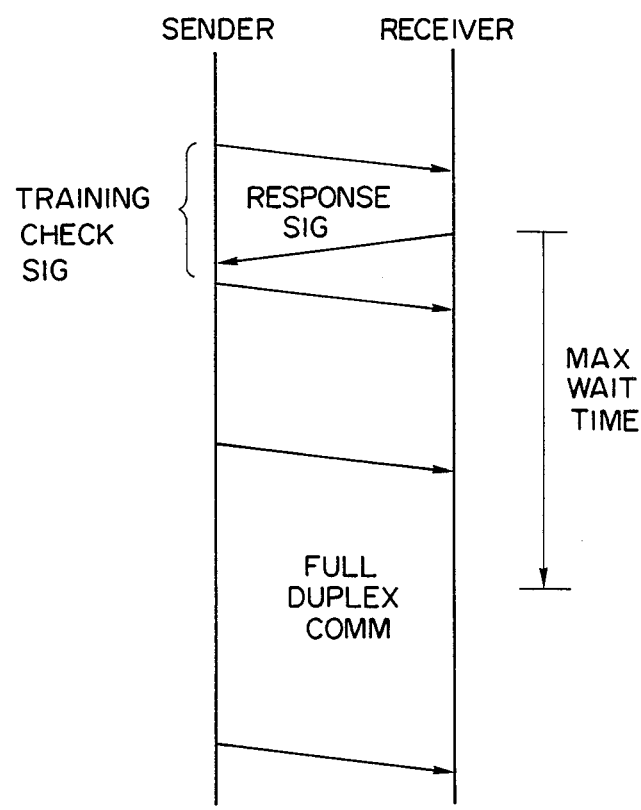
FIGS. 8, 9, and 10 are views showing communication sequences of the embodiment shown in FIG. 7.

FIG. 8 is a view showing a sequence of the receiver in the embodiment of FIG. 7. As is apparent from the above description of the embodiment of FIG. 7 and the sequence of FIG. 8, a training check signal (TCF) is sent out from the sender to the receiver prior to image signal transmission. During transmission of the training check signal, the receiver checks this training check signal. Only if the training check signal is normal, a predetermined response signal (e.g., an error acknowledgment signal used in the error control protocol) is sent from the receiver to the sender. The sender monitors the reception state of the response signal while sending out the training check signal so as to determine whether the normal response signal can be received. In a circuit state in which the response signal cannot be received, the sender transmits an image signal by half duplex communication (i.e., without error control protocols).

When the training check signal (TCF) is not normally received by the receiver, the receiver does not send the response signal (error acknowledgment signal) to the sender and performs communication in accordance with the conventional protocol.

The bidirectional circuit check can be performed during the training check sequence, and full duplex communication is effected only when image data can be received within a predetermined wait time after the response signal is sent from the receiver to the sender. Therefore, extra control signals are not required, and full duplex communication or half duplex communication can be selected within a short period of time.

The error acknowledgment signal NACK which has been used in the error control protocol is used as the response signal (ACK signal), and the NACK signal is sent during reception of the training check signal TCF (parallel operation with training of the image signal). Therefore, additional control signals need not be used. Since the NACK signal is sent out to the sender only when the normal training signal TCF is received, the receive-affirmative signal CFR signal need not be used. Therefore, optimal visual communication can be performed within a short control time without greatly changing the conventional communication control protocols.

Figure 9:
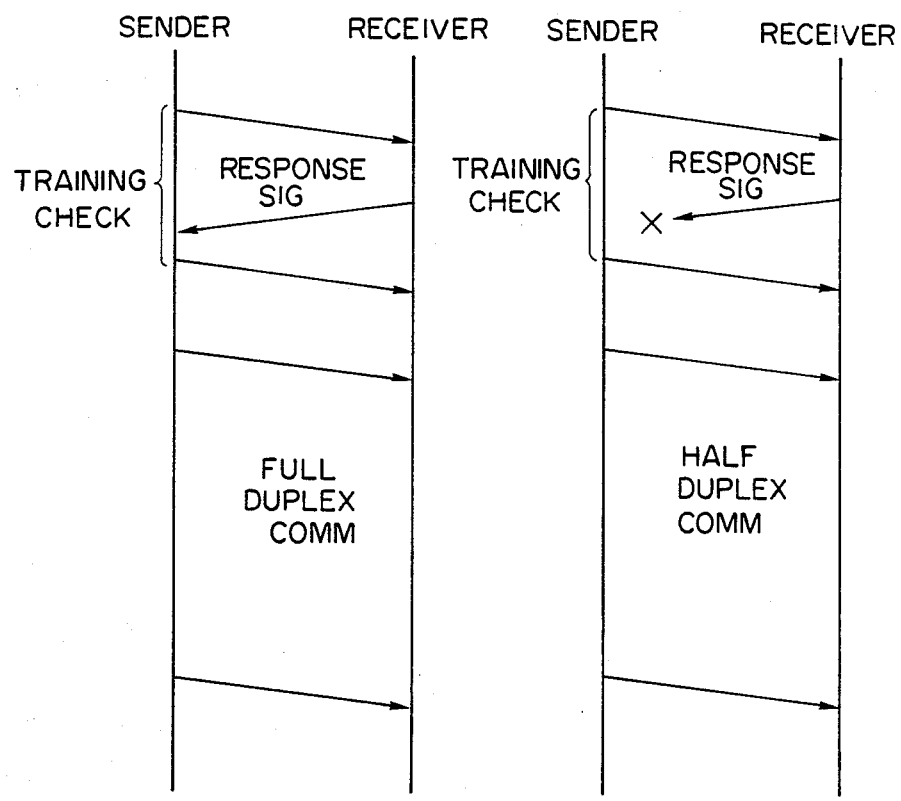

FIG. 9 is a view showing a communication sequence of an image data communication system in this embodiment. In this embodiment, in the image communication system for exchanging image data by full duplex communication, image data is sent out by half duplex communication if the predetermined response signal is not received by the sender during the training check sequence prior to image data transmission.

Such a visual communication system will be described in detail.

Prior to image signal transmission, a training check signal (TCF) is sent from the sender to the receiver. Meanwhile, the receiver checks this training check signal. A predetermined response signal (e.g., an error acknowledgment signal used in the error control protocols) is sent from the receiver to the sender only if the training check signal is normal. The sender monitors the reception state of the response signal while sending the training check signal to the receiver, thereby determining whether normal reception of the response signal is possible. As a result, if the sender determines a circuit state disabling reception of the response signal, the sender transmits an image signal by half duplex communication (i.e., without error control protocols).

When the training check signal (TCF) cannot be normally received by the receiver, the receiver does not send the response signal (error acknowledgment signal) to the sender and performs communication in accordance with the conventional protocols.

The reception states of the signals between the sender and the receiver can simultaneously checked by one training check sequence, thereby eliminating the first disadvantage.

The timer functions (time counting functions) are provided to the sender and the receiver, respectively. The timer functions are effected in the training check sequence to eliminate the second and third disadvantages caused by the circuit propagation delay.

Figure 10:
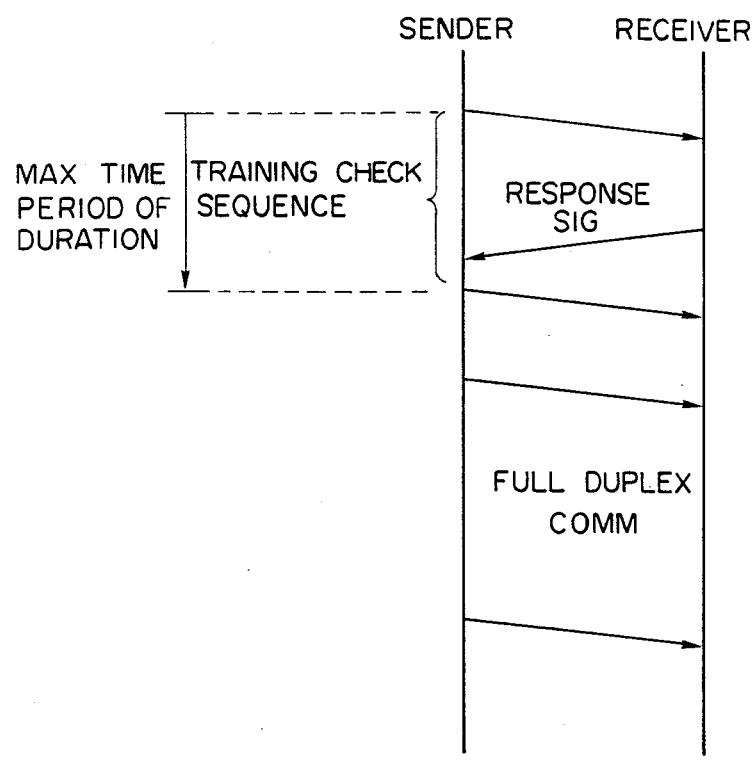

FIG. 10 is a view showing a communication sequence of the sender of this embodiment.

Prior to image signal transmission, a training check signal (TCF) is sent from the sender to the receiver. Meanwhile, the receiver checks this training check signal. A predetermined response signal (e.g., an error acknowledgment signal used in the error control protocols) is sent from the receiver to the sender only if the training check signal is normal. The sender monitors the reception state of the response signal while sending the training check signal to the receiver, thereby determining whether normal reception of the response signal is possible. As a result, if the sender determines a circuit state disabling reception of the response signal, the sender transmits an image signal by half duplex communication (i.e., without error control protocols).

When the training check signal (TCF) cannot be normally received by the receiver, the receiver does not send the response signal (error acknowledgment signal) to the sender and performs communication in accordance with the conventional protocols.

The reception states of the signals between the sender and the receiver can be simultaneously checked by one training check sequence, thereby eliminating the first disadvantage.

The timer function (time counting function) is provided to the sender. The timer function is effected in the training check sequence to eliminate the second and third disadvantages caused by the circuit propagation delay.

The present invention is not limited to the particular embodiments described above. Various changes and modifications may be made within the spirit and scope of the invention. For example, the circuit arrangements in the facsimile apparatus and the format of the error acknowledgment signal may be arbitrarily modified without departing from the scope of the invention.

The present invention is not limited to the facsimile apparatus but can also be applied to all data communication apparatuses for performing full duplex communication and a communication test sequence prior to data communication.

We claim:

1. A data transmission apparatus comprising:
    means for transmitting data according to full duplex communication;
    means for transmitting data according to half duplex communication;
    means for transmitting a test signal prior to the data transmission;
    means for detecting a signal from a destination responsive to the test signal during transmission of the test signal; and
    means for selecting the full duplex communication or the half duplex communication on the basis of a detection result by said detection means.

2. An apparatus according to claim 1, wherein said test signal comprises dummy data.

3. An apparatus according to claim 1, wherein said selecting means effects its select operation in such a manner that if the response signal is detected, the full duplex communication is selected, and if not, the half duplex communication is selected.

4. An apparatus according to claim 1, wherein the data is image data.

5. A data reception apparatus comprising:
    means for receiving data according to full duplex communication;
    means for receiving data according to half duplex communication;
    means for receiving a test signal prior to data reception;
    means for transmitting a predetermined response signal responsive to the test signal during reception of the test signal; and
    means for discriminating whether the data is received or not within a predetermined period of time after the response signal is transmitted, said discriminating means selecting one of said full duplex communication and said half duplex communication on the basis of the discrimination result.

6. An apparatus according to claim 5, wherein the data is image signal, and the test signal is a training signal.

7. An apparatus according to claim 5, wherein the data is received by full duplex communication when the data is received within the predetermined period of time after the response signal is transmitted.

8. An apparatus according to claim 5, wherein the reception of the data by full duplex communication is performed while a receiver-response signal for the reception data is transmitted as a backward signal.

9. A data transmission apparatus comprising:
    means for transmitting data by full duplex communication;
    means for transmitting a test signal of the data communication prior to the data transmission; and
    means for detecting whether a full duplex communication backward signal is received from a receiver during transmission of the test signal by said test signal transmitting means and for determining whether full duplex communication is possible on the basis of a detection result, said backward signal being a response signal to the test signal.

10. An apparatus according to claim 9, further comprising means for performing data transmission by half duplex communication, the data transmission being performed by half duplex communication when full duplex communication is impossible.

11. An apparatus according to claim 9, further comprising a memory for storing data to be transmitted, and means for setting a test time of said testing means in accordance with a capacity of said memory.

12. A data transmission apparatus comprising: a memory for storing data; means for performing data transmission by full duplex communication;

means for performing a test of data communication prior to the data transmission; and means for detecting whether a full duplex communication backward signal is detected from a receiver during a test period and for determining whether full duplex communication is possible on the basis of a detection result, wherein the test period of said testing means is set in accordance with a capacity of said memory, and said determining means determines that full duplex communication is impossible when the backward signal is not received during the test period.

13. An apparatus according to claim 12, further comprising means for performing data transmission by half duplex communication, the data transmission being performed by half duplex communication when full duplex communication is impossible.

* * * * *

UNITED STATES PATENT AND TRADEMARK OFFICE
CERTIFICATE OF CORRECTION

PATENT NO.   : 4,897,831

DATED        : January 30, 1990

INVENTOR(S)  : TSUNEO NEGI, ET AL.

It is certified that error appears in the above-identified patent and that said Letters Patent is hereby corrected as shown below:

SHEET 3 OF 10

Fig. 3, "VIDUAL" should read --VISUAL--.

COLUMN 5

Line 48  "(" should be deleted.

COLUMN 9

Line 4, "comprising: a" should read --comprising: ¶ a--.
    Line 5, "data; means" should read --data; ¶ means--.

Signed and Sealed this

Twenty-ninth Day of October, 1991

Attest:

HARRY F. MANBECK, JR.

*Attesting Officer*      *Commissioner of Patents and Trademarks*